United States Patent [19]

Woog

[11] 4,130,273
[45] Dec. 19, 1978

[54] SILVER RECOVERY IMPROVEMENTS

[76] Inventor: Gunter G. Woog, P. O. Box 43, West Bend, Wis. 53095

[21] Appl. No.: 788,052

[22] Filed: Apr. 15, 1977

[51] Int. Cl.² .................. C22B 11/12; G01W 1/14
[52] U.S. Cl. ............................. 266/79; 73/219; 73/423 R; 266/170
[58] Field of Search ............ 73/219, 423 R; 266/79, 266/101, 170

[56] References Cited

U.S. PATENT DOCUMENTS

| | | | |
|---|---|---|---|
| 1,571,201 | 2/1926 | Jefferies | 73/423 R |
| 1,593,623 | 7/1926 | Elliott et al. | 73/423 R |
| 1,798,788 | 3/1931 | Dyer | 73/423 R |
| 3,840,217 | 10/1974 | Mackay | 266/170 |
| 3,943,762 | 3/1976 | Baer | 73/219 X |

FOREIGN PATENT DOCUMENTS 220538  3/1968  U.S.S.R. .................. 73/219

*Primary Examiner*—Roy Lake
*Assistant Examiner*—Paul A. Bell
*Attorney, Agent, or Firm*—Lynn G. Foster

[57] ABSTRACT

An apparatus for and method of recovering silver from liquid solution containing silver, the apparatus comprising an ionic exchange chamber wherein a sludge containing silver is precipitated from the solution, the apparatus further comprising a device to measure the flow of solution through the chamber and to obtain a representative sample from the solution displaced therethrough. In accordance with one aspect of the invention, the metering and sampling are accomplished in a single unit. It is preferred that the metering and sampling unit be situated to receive solution prior to its entry into the precipitation chamber, although the effluent solution leaving the chamber may be metered and sampled as well. The metering and sampling device illustrated comprises a tilting tray pivotally disposed in a metering chamber. Upon each oscillation of the tray, a known amount of solution is thus caused to be discharged from the compartments of the tray. A mechanical counter is provided to record the number of oscillations of the tray, so that the total amount of solution flowing through the precipitation chamber over a period of time is known. Each time the tray oscillates, a small amount of fluid is caused to flow from the chute into a sampling chamber where a cumulative representative sample is collected.

3 Claims, 12 Drawing Figures

SILVER RECOVERY IMPROVEMENTS

BACKGROUND

1. Field of the Invention

The present invention relates broadly to metering and sampling of gravity pressure solution overflows and particularly to the recovery of silver from solutions containing silver and to gravity flow silver and like recovery units and related methods for the foregoing purpose, the apparatus novelly comprising a device for metering the amount of flow of solution through the silver recovery unit and for taking a representative sample of the solution for subsequent analysis so that the efficiency of the silver recovery unit may be readily and accurately determined.

2. Prior Art

Heretofore, silver recovery apparatus has been provided whereby silver may be recovered from solutions containing silver by causing the solution to flow by gravity through a recovery unit in which metal screen or the like is disposed for contact with the solution, so that an ionic exchange occurs precipitating the silver as sludge within the unit. However, previously proposed silver recovery units made no provision for metering and sampling the solution from which silver is recovered. Accordingly, it has not been possible to reliably and accurately assess both the honestly of personnel processing the silver and the efficiency of the silver recovery unit. Consequently, many silver recovery units have been inefficient, and valuable silver has remained in the effluent solution.

The aforesaid situation has been particularly acute in photographic developing laboratories, where spent photographic developing (fixing) solutions contain significant amounts of silver in the form of silver nitrate. A definite need, long standing in the art, has existed for a silver recovery apparatus which meters and samples the solution to evaluate the efficiency of recovery as well as the honesty of the persons handling the recovery.

BRIEF SUMMARY AND OBJECTS OF THE INVENTION

The present invention overcomes the aforesaid disadvantages in the prior art and provides apparatus and related methods for metering and sampling gravity displaced solutions and particularly where silver and other metal is being recovered. The quantity of solution treated is thus measured and recorded prior to its entry into an ionic exchange chamber of the recovery apparatus or, alternatively, as it emerges from the exchange chamber. Also, a representative sample of the solution is collected. The sample may be subsequently analyzed to determine its percentage silver content, which information may be used along with the recorded amount of solution treated and the amount of silver ultimately recovered to ascertain the efficiency of the silver recovery unit. Metering and sampling of silver solution being treated for recovery of silver in assessing the efficiency of silver recovery units have not been provided heretofore, in the art, and have not been provided as part of the silver recovery unit.

With the foregoing in mind, it is a primary object of the present invention to provide novel apparatus and related methods whereby solution cause to flow by force of gravity is sampled and quantified.

It is another paramount object of the present invention to provide a silver recovery apparatus which meters the quantity of silver-bearing solution flowing therethrough.

Another important object of the present invention is to provide a silver recovery apparatus whereby the solution passing therethrough is sampled.

Another object of the invention is to provide a silver recovery apparatus and method for metering the amount of solution entering therein for the recovery of silver therefrom.

Another object of the invention is to provide a silver recovery apparatus for measuring the quantity of solution from which silver is obtained.

A further object of the invention is to provide an apparatus for recovery of silver from solutions whereby a representative sample of the solution may be accumulated.

Another important object of the present invention is to provide a silver recovery apparatus comprising solution metering and sampling structure in conjunction with an ion exchange chamber.

Another object of the invention is to provide a silver recovery apparatus whereby successive amounts of solution flowing therethrough may be recorded and a small amount taken from each so as to collect a representative cumulative sample of the total quantity of solution flowing through the apparatus.

These and other objects and features of the present invention will be apparent from the foregoing detailed description taken in conjunction with the accompanying drawings.

DETAILED DESCRIPTION OF THE ILLUSTRATED EMBODIMENT

Figure 7:
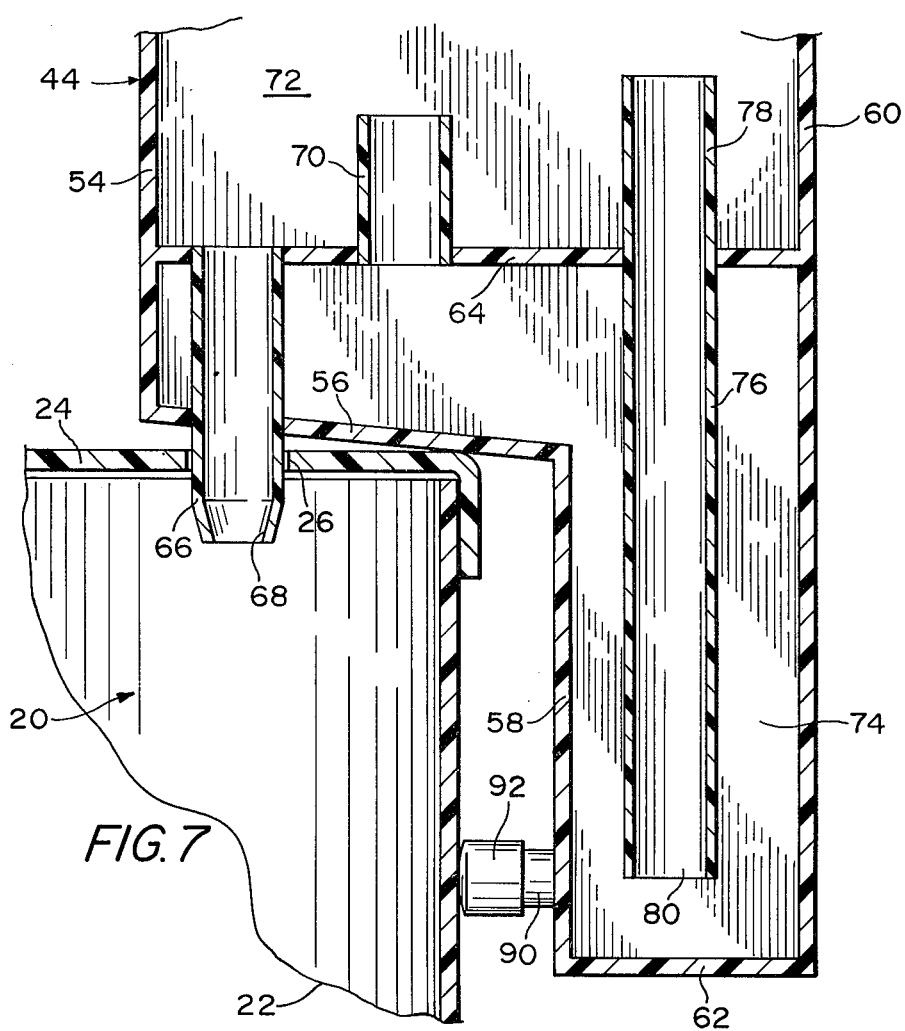
FIG. 7 is an enlarged fragmentary cross-sectional view of the metering and sampling chambers of the device of FIG. 1 further illustrating the device mounted upon a silver recovery unit.

Reference is now made to the Figures wherein like numerals are used to designate like parts throughout. Broadly, a silver recovery unit is illustrated in FIG. 7 and generally designated 20. The unit 20 comprises a bucket 22 having an open top which is covered by a lid 24. The lid typically has influent and effluent apertures. Only the influent aperture at 26 is illustrated in FIG. 7. Silver containing solution is caused to flow by gravity through the silver recovery unit 20 with the interior of the bucket 22 comprising an ion exchange chamber wherein the silver is precipitated from the solution and deposited in the bottom of the bucket 22 as a sludge. The influent solution typically comprises spent photographic bleach-fix liquid obtained from a photographic bleach-fix tank, not shown, one constituent of which is silver.

While the metering and sampling device illustrated in the Figures are generally designated 30 is shown in FIG. 7 receiving influent solution prior to discharge into the bucket 22, it is to be appreciated that the present invention embraces also the metering and sampling of effluent solution from a silver recovery or like unit.

Figure 8:
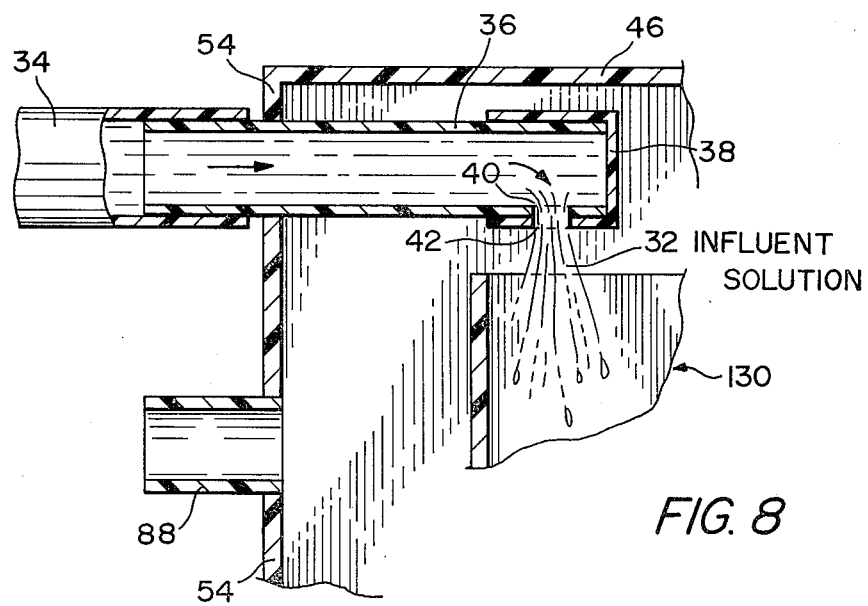
FIG. 8 is an enlarged fragmentary cross-sectional view illustrating the manner in which influent solution reaches the metering and sampling device of FIG. 1.
Figure 9:
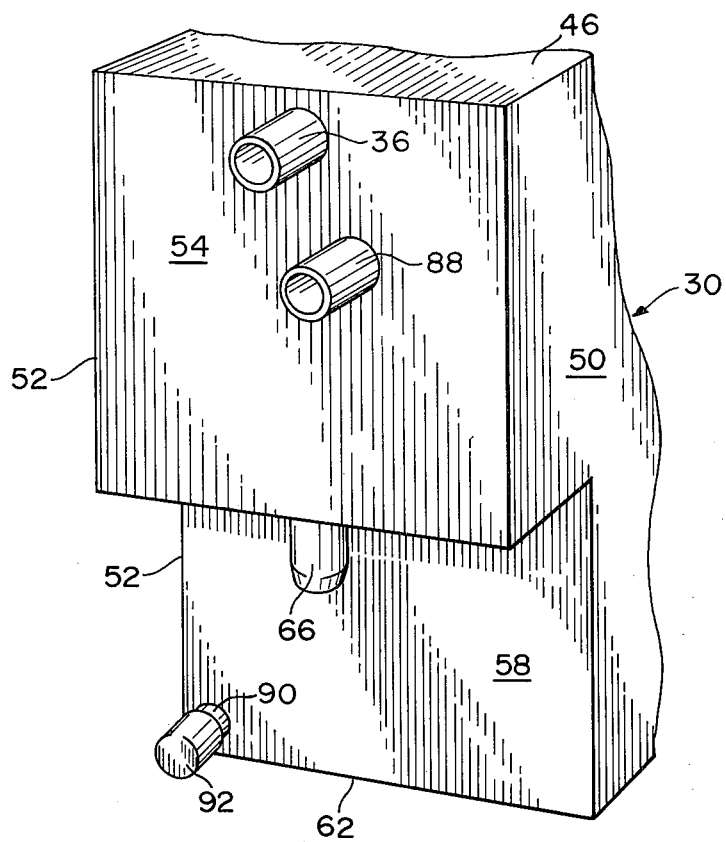
FIG. 9 is a perspective view primarily of the rear of the metering and sampling device of FIG. 1.

The influent (fixer) solution 32 is received under force of gravity from an external conduit 34 (FIG. 8) and passes through the solution influent to 36 into the interior of the device 30, the interior end of the influent solution tube 36 being closed with a cap 38 which is in fluid-type relationship with the tube 36. The tube at 40 and the cap at 42 define a pair of aligned orifices whereby the influent solution 32 flows by force of gravity downward at a particular location within the device 30.

Figure 1:
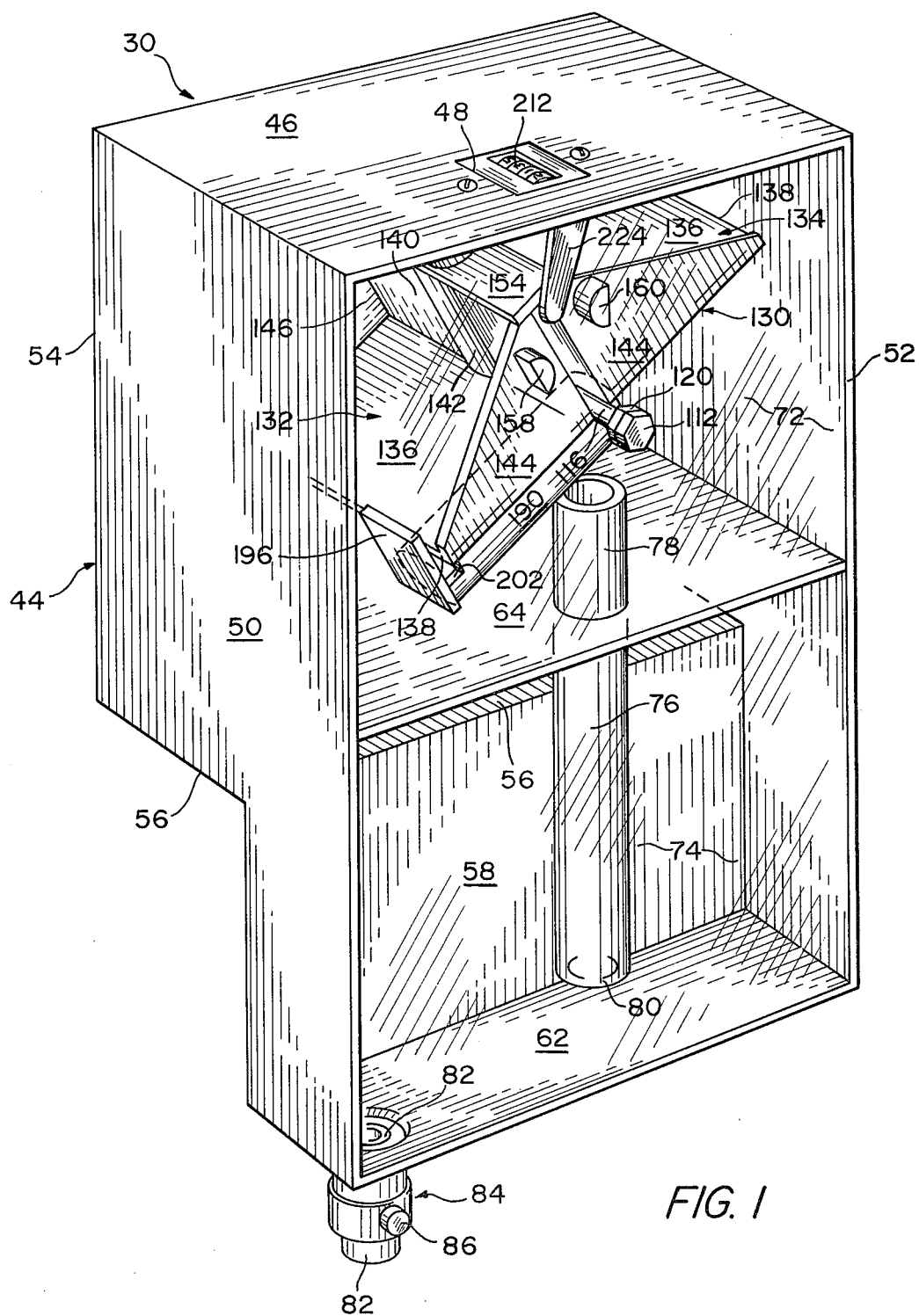
FIG. 1 is a perspective representation of the presently preferred embodiment according to the present invention.

The device 30 comprises a fluid-tight containment 44. The fluid-tight nature of the containment is achieved either by integral molding techniques of conventional type or by utilization of bonded joints between the walls of the containment 44, or in some other conventional fashion. More specifically, the containment 44 comprises a metering top wall 46 which includes a display window 48, opposed identical through opposite hand vertical side walls 50 and 52, an upper rear wall 54, a tapered rear wall 56, a lower rear wall 58, a front wall 60 (which may be transparent as illustrated in FIG. 1) and a sampling bottom wall 62. One or more walls may be made removable to provide access to the interior of the device 30. The containment 44 also comprises an interior metering bottom wall 64.

The metering bottom wall 64 is interrupted by three openings. One of these openings integrally receives in flush relation the top of a bucket influent tube 66 the lower end of which is constricted at 68. The tube 66 also passes through the tapered rear wall 56 in fluid-tight relation and is adapted to be force fit through the aperture 26 of the bucket lid 24 as illustrated in FIG. 7.

The metering bottom wall 64 also receives in flush relation the bottom end of a metering standpipe 70. The height of standpipe 70 is selected such that in the event the bucket influent tube 66 becomes clogged that solution may be discharged from an upper metering chamber 72 (that part of the containment 44 above the metering bottom wall 64) into a sampling chamber 74 (that part of the containment 44 below the metering bottom wall 64).

The metering bottom wall is also interrupted by a sampling standpipe 76 which is integral with the wall 64 and extends at its upper end 78 to an elevation higher than the upper end of standpipe 70, with the lower end 80 of the standpipe 76 extending to a location immediately above the sampling bottom wall 62. The standpipe 76 provides for communication of a limited amount of solution to ultimately create a cumulative sample to be confined to the sampling chamber 74 and removed therefrom from time to time as desired through a sampling effluent tube 82 (FIG. 1) disposed at a sampling discharge site 84 adjacent the sampling bottom wall 62 by manipultaion of a manual spring-loaded valve 86.

The containment 44 also comprises a discharge tube 88 at upper rear wall 54. Discharge tube 88 merely permits solution to flow therefrom in the event that the bucket influent tube 66 becomes clogged or impassable, and the sampling and metering chambers 74 have become filled of solution up to the level of the discharge tube 88. Preferably, a hose or the like (not shown) would be press fit upon the exteriorly projecting tube 88 for communicating (under the indicated circumstances) solution from the containment 44 to a suitable waste site.

An anti-rotate stop 90 (FIG. 7) is integrally attached to the lower rear wall 58 and projects outwardly perpendicular to the wall. The anti-rotate stop 90 may be of hollow tubular stock and is illustrated as comprising an elastomeric cap 92, which engages the exterior surface of the bucket 22 when the device 30 is installed as illustrated in FIG. 7 thereby providing stability to the device 30 in its installed location.

In a similar fashion, a first tray stop 100 and a second tray stop 102 are integrally attached to the metering top wall 46 and project downwardly into the metering chamber 72. Each tray stop 100, 102 is a hollow tube, the lower end of each being covered by an elastomeric cap 104 and 106, respectively. The stops 100 and 102 define the permitted degree of rotation of the tray in a manner and for purposes hereinafter described.

The front wall 60 comprises an aperture 108 (FIG. 12) through which the shank 110 of a nut 112 projects in snug relationship. The shank 110 comprises a blind bore 114 in which an end of a pivot rod 116 is journalled, the exterior of the shank 110 comprising threads 118 onto which a lock nut 120 is turned to secure the nut 112 in the illustrated tightened position.

Figure 12:
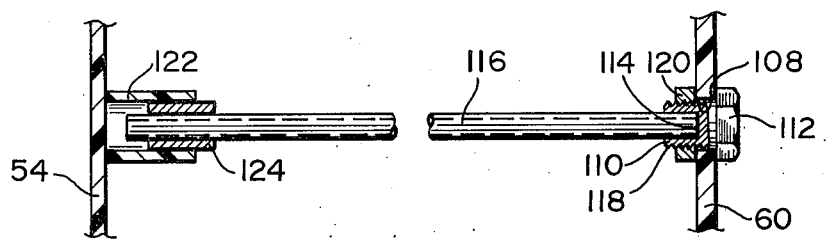
FIG. 12 is a cross-sectional view illustrating the tray pivot rod and the manner in which it is mounted within the metering chamber of the device of FIG. 1.

A tubular receptacle 122 is integrally mounted to the upper rear wall 54 as illustrated in FIG. 12 and snugly receives a sleeve-bearing 124 in journalled relation, the trailing end of the rod 116 rotatably fitting through the central bore in the sleeve 124. Thus, the pivot rod 116 is mounted to accommodate tray rotation as hereinafter more fully decribed.

Reference is now made to FIGS. 2 through 6, which illustrate the presently preferred two-compartment tray, generally designated 130, fabricated in accordance with the present invention. The two-compartment tray comprises left and right compartments, generally designated 132 and 134, respectively. Since each compartment is identical though opposite hand, only one need be described. Each compartment comprises a floor 136 spanning between a discharge lip 138, a central wall 140 (which is centrally interrupted by a cylindrical portion 142) and trianularly shaped front and rear end walls 144 and 146. The floor 136 and the walls 140, 144, and 146 are integral one with the others at their respective interfaces by reason of integral molding, bonding at the joints or the like. Thus, two generally wedge-shaped compartments exist comprising the tray 130.

Figure 2:
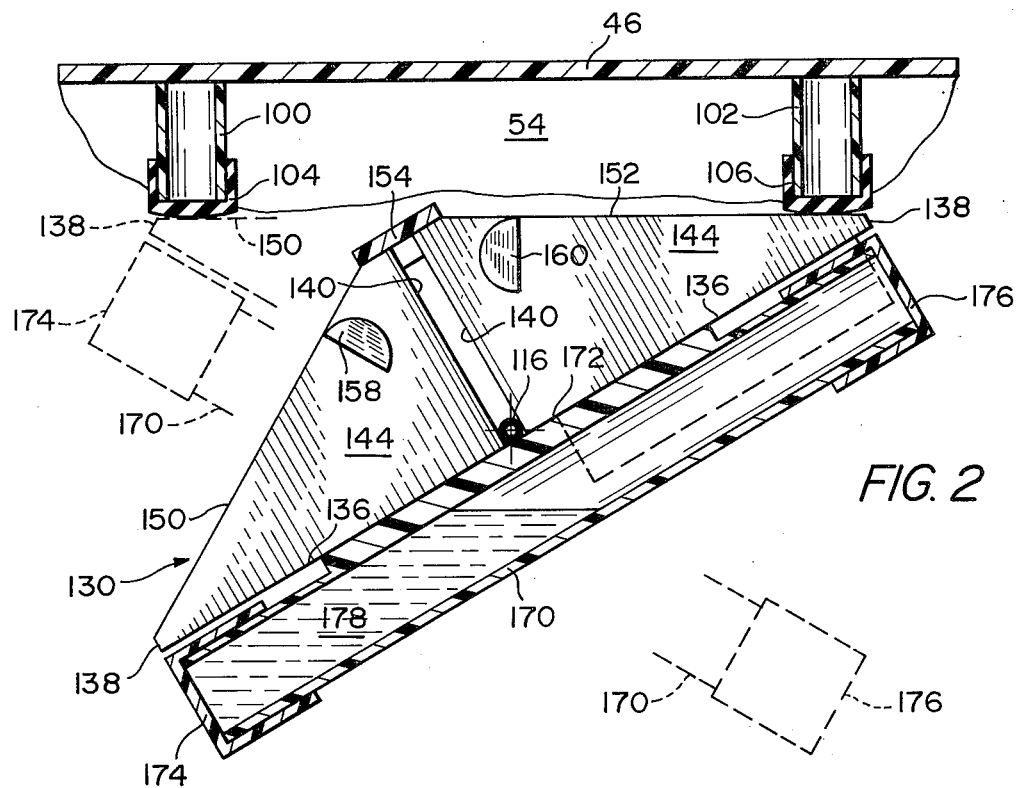
FIG. 2 is an enlarged fragmentary view, with parts shown in cross section for clarity, of the two compartment metering tray of the metering and sampling device of FIG. 1.
Figure 3:
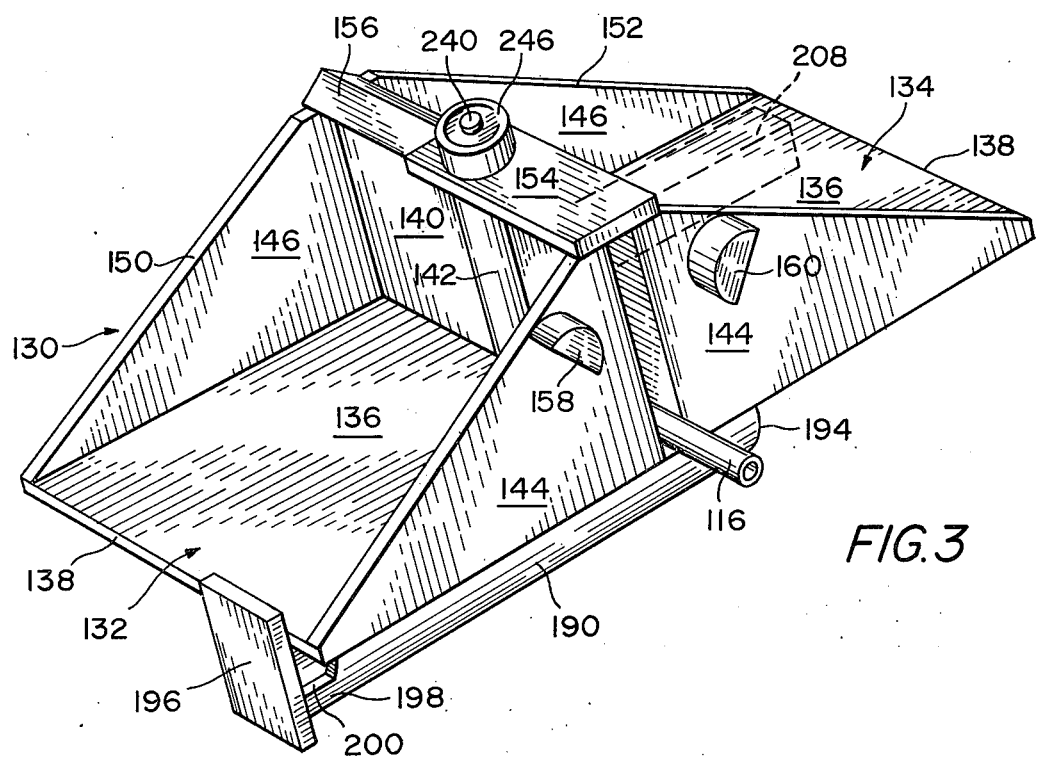
FIG. 3 is a perspective representation of the presently preferred two compartment tray of the present invention.

As can be clearly seen in FIGS. 2 through 6, the wall 140 of compartment 132 is spaced from wall 140 of compartment 134 by a distance equal to the diameter of the pivot rod 116, which is selectively bonded at certain locations to the exterior said walls 140 in the position illustrated. The rod is located in a satisfactory position within the metering chamber as illustrated in FIG. 12. More specifically, the tray (and the rod) is located so that the edges 150 and 152 of the compartment end walls 146 respectively engage the stops 100 and 102 as illustrated in FIG. 2. Thus, edges 150 and 152 respectively move into and away from a horizontal disposition, the edge 152 being illustrated in the mentioned horizontal disposition in FIG. 2. Edge 150 is shown in dotted lines in the horizontal position.

The spacing between the two adjacent walls 140 of the compartments of the tray is also maintained by a top plate 154 and a pitched flow deflector 156 (FIG. 3) each of which is integral with the top edge of said walls 140.

The opposed front walls 144 each integrally receive a forwardly projecting stop 158 and 160, respectively. Each stop is semi-cylindrical in configuration with the rounded portion directed toward the adjacent stop. The spacing between the stops 158 and 160 is selected and the stops are located and sized so as to actuate a counter in a fashion and for purposes hereinafter more fully explained.

Figure 6:
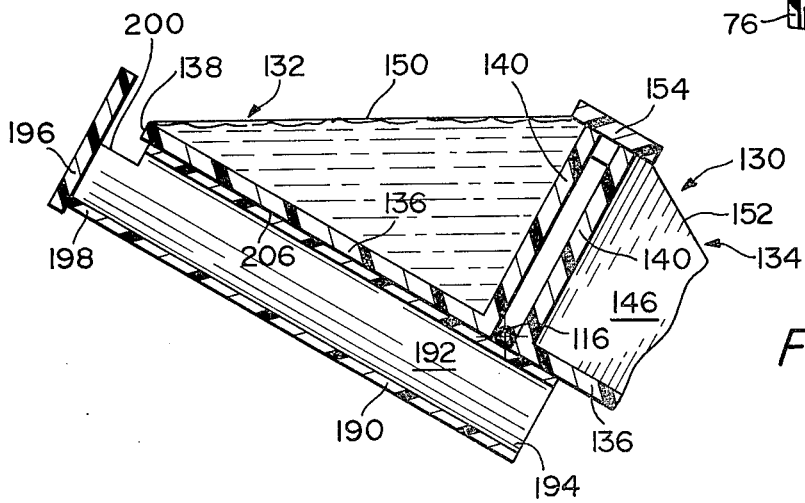
FIG. 6 is a fragmentary cross-sectional view similar to FIG. 5 illustrating the left compartment of the two compartments of the tray entirely filled with solution.

The reason it is desirable for the wall edges 150 and 152 to respectively become disposed in a horizontal orientation is to allow each compartment on a successive basis to become entirely filled with solution, as best illustrated in FIG. 6.

Naturally, in the absence of other forces, the laws of physics would not permit either compartment to become entirely filled with solution prior to tray rotation. To insure that the tray does not prematurely tip and one of the two compartments discharge the accumulated solution prematurely, a counter-balancing arrangement is provided, which is best illustrated in FIG. 2. Specifically, a tube 170, illustrated as running the entire width of the tray 130, is secured by bonding or the like to the bottom walls 136 of the two compartments at location 172. For purposes of avoiding eccentric loading, the counter-balance tube 170 is preferably disposed midway between the front and back of the tray 130. At the respective ends of the counter-balance tube 170 are capped at 174 and 176 in succession, the counter-balance tube 170 being appropriately partially filled with liquid after one cap has been so positioned and before the other is so placed. The amount of counter-balance fluid 178 is optional and should be sufficient so that the moment about pivot rod 116 caused by the fluid 178 is just slightly less in magnitude than the opposite moment created by solution in one of the two compartments when the compartment has become entirely filled. In this way, the tray 130 will begin to rotate slowly only when one compartment is entirely filled with solution thereby insuring that each said displacement of the tray will dispense across one of the discharge lips 138 a known and predetermined amount of solution into the metering chamber and thence through the bucket influent tube 66 into the silver recovery unit 20. Because of the way in which the counter-balance tube 70 and counter-balance liquid 178 are situated, the moment thereby created is always opposite the moment being created by the tray compartment concurrently being filled with solution.

The flow deflector 156 aids in insuring that influent solution from influent tube 36 passing through the orifices 40 and 42 will become disposed in the compartment opposite the counter-balance liquid 178.

Figure 4:
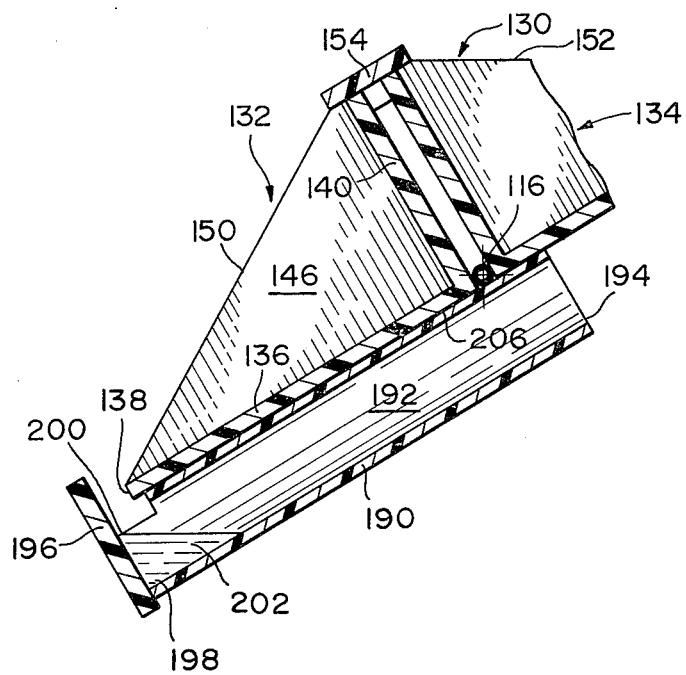
FIG. 4 is a fragmentary enlarged cross-sectional view of part of the tray of FIG. 3 illustrating the sample obtaining chute in its fluid receiving position.
Figure 5:
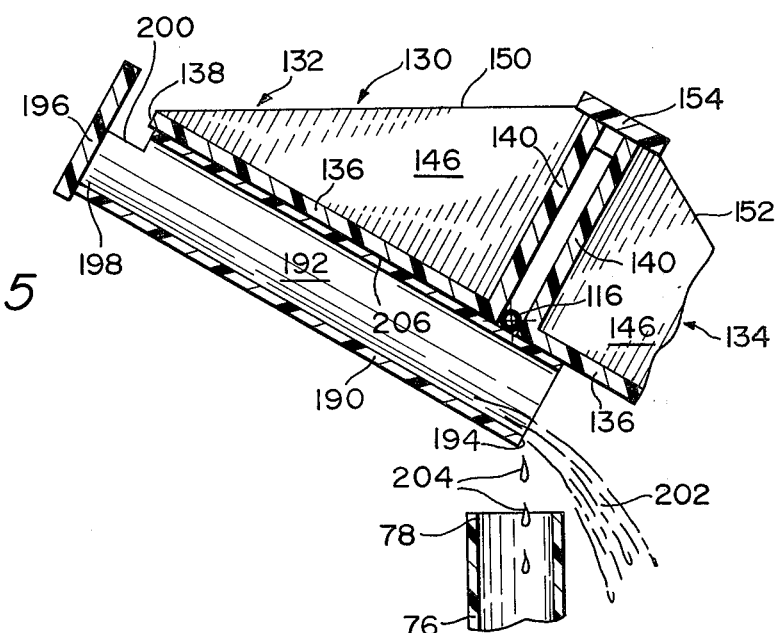
FIG. 5 is a fragmentary enlarged cross-sectional view of the sampling chute of FIG. 4 in its discharge position.

With particular reference to FIGS. 4 through 6, the tray 130 is equipped with a sampling chute 190, which is tubular in form and comprises a hollow interior 192, a discharge opening 194 and end wall 196, closing the exposed end 198 of the chute 190 and projecting upwardly a distance substantially above the adjacent lip 138 for the purpose of deflecting solution moving by force of gravity over the lip 138 downward through an elevated bird's mouth 200 into the hollow interior 192. This occurs only when the tray 130 rotates from the position of FIG. 6 when the left compartment 136 is entirely full of solution to the position of FIG. 4, thereby placing a sample 202 of the solution within the hollow 192 of the sample chute 190 as illustrated. The sample solution 202 remains in the illustrated position of FIG. 4 until the compartment 134 becomes entirely filled with solution causing the tray toward the position of FIG. 5. This causes nearly all of the sample solution 202 to cascade outwardly beyond the upper end 78 of the tube 76, as illustrated in FIG. 5 with a few drops 204 falling through the hollow of the tubes 76 into the sampling chamber 74.

Sampling chute 190 is secured along its upper edge at 206 to the bottom 136 adjacent the front face 144.

In order to prevent imbalance, a suitably sized and weighted counter-balance weight 208 (FIG. 3) is comparably located and made integral with the bottom 136 of the compartment 134 adjacent the rear wall 146. Thus, the sampling chute 90 and the counter-balance weight 208 creates essentially equal and opposite moments in respect to the pivot rod 116.

Figure 10:
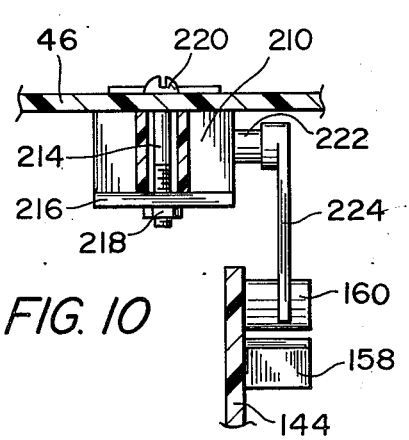
FIG. 10 is an enlarged fragmentary cross-sectional view of the counter of the metering portion of the device of FIG. 1.

With reference to FIG. 10, there is noted at display window 48 of the containment 44 (see FIG. 1) a counter 210 of conventional design having display digits 212 (FIG. 1) exposed at the window 48 with the counter 210 secured by a pair of bolts 214 spanning between the top wall 44 and a flange 216 of the counter with a threaded nut 218 abutting the flange 216 and the bolt head 220 abutting the exterior surface of the wall 46. The counter comprises a counter shaft 222 with a spline-like terminal end (not shown) upon which a ratchet counter arm 224 is mounted. The arm 224 extends as illustrated in FIG. 1 to a location intermediate the compartment stops 158 and 160 such that rotation of the tray 130 will actuate the arm 224 first in one direction and then the other. Thus, if each compartment 132 and 134 is sized to contain exactly 1/20 of one liter of solution, displacement of the arm 224 first in one direction and then in the other would cause the numerical display 212 to increase in the amount of 1/10 of 1 liter. In this way, assuming the meter display 212 is set to zero to begin with or is red initially, the reading or the difference after a predetermined period of time will unequivocally identify the amount of solution passing through the metering and sampling device 30 which in turn will likewise pass through the silver recovery unit 20.

Figure 11:
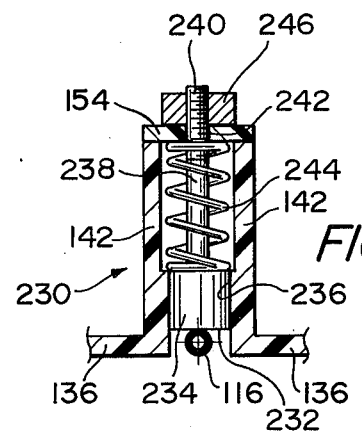
FIG. 11 illustrates a leveling mechanism for the pivot rod.

In order to avoid error due to eccentricity, the rod leveling mechanism 230 illustrated in FIG. 11 is provided. The central projection 142 which merge with the opposed walls 140 house internally a bolt 232 having a cylindrical head 234, reciprcally mounted at 236, a shaft 238 and a threaded 240. The threaded end 240 passes through an aperture 242 in the tray plate 154, previously described, the bottom of the plate 154 receiving the top of the spring 244. The lower end of the spring butts the bolt head 234. A nut 246 threaded upon the end 240 can be adjusted to in effect lightly elevate or slightly lower the bolt head 234 which is integrally secured to the rod 116. In this way, the central portion of the rod 116 can be adjusted so that the rod 116 is entirely lineal from end to end thereby accomodating smooth rotation of the tray as described.

The invention may be embodied in other specific forms without departing from the spirit or essential characteristics thereof. The present embodiment is therefore considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent Is:

1. An apparatus for recovering metal from a liquid comprising said metal, the apparatus comprising:
    a metal recovery chamber through which the liquid is caused to flow in contact with the surfaces of objects of metal higher in the electromotive series than the metal in the liquid so that said mentioned metal is precipitated through ionic exchange, which precipitated metal may later be removed and refined;
    a single container externally carried adjacent the metal recovery chamber, said single container liquid influent means, metering means and sampling means;
    said metering means being disposed within the container and receiving all the liquid caused to flow through the metal recovery chamber, said metering means comprising means measuring the quantity of liquid caused to flow through the chamber during a predetermined interval of time and unobstructed liquid effluent discharge means; and
    said sampling means being disposed within the container and receiving only a negligible amount of the liquid measured by the metering means, said sampling means comprising storage means, means periodically causing samples of said liquid to be deposited cumulatively in the storage means and selectively operable sample effluent discharge means.

2. An apparatus for processing a liquid and recovering a substance therefrom, the apparatus comprising:
    a confinement through which all of the liquid is caused to flow under force of gravity only;
    means within the confinement processing the liquid, recovering a substance therefrom and discharging the liquid from which the substance has been removed;
    an enclosed liquid processing containment adjacent the confinement, the containment comprising metering means and sampling means therein;
    said metering means receiving all the liquid which is caused to pass through the confinement, the metering means comprising means measuring the entire quantity of liquid caused to pass through the confinement during a predetermined interval of time and means draining without delay the liquid issuing from the metering means; and
    said sampling means receiving a minute portion of the liquid measured by the metering means, said sampling means comprising means successively segregating small samples of said liquid and cumulating said samples in storage means of the sampling means for subsequent discharge and analysis to determine the content thereof.

3. An apparatus for recovering silver from liquid containing silver, the apparatus comprising:
    a silver precipitation chamber through which the liquid is caused to flow, wherein the liquid is caused to come into communication with the surfaces of objects therein comprising a metal higher in the electromotive force series than silver, so that the silver is precipitated from the liquid through ionic exchange, the silver remaining in the chamber for subsequent removal and refinement;
    an enclosure housing therein metering means and sampling means for determining the quantity and quality of liquid passing through the chamber;
    the metering means comprising a solution-receiving tray pivotally mounted in the enclosure about an axis of rotation, and comprising two substantially similar upwardly opening wedge-shaped compartments symmetrically disposed on opposite sides of the axis of rotation, the open compartments alternately receiving liquid flowing into the container from an enclosure inlet vertically above the tray so that the tray oscillates by successively pivoting clockwise and counterclockwise under the influence of gravity acting on the eccentric weight of liquid in the one compartment of the tray being filled at any point in time whereby a discrete increment of liquid is also caused to flow successively from first one top compartment and then the other;
    counter means carried by the enclosure so that the number of oscillations of the tray is recorded and the total quantity of liquid flowing through the precipitation chamber determined; and
    sampling means comprising means carried by the tray comprising liquid flow passage means said passage means communicating a small portion of liquid from the tray to a cumulation site within the enclosure upon each rotation of the tray.

* * * * *